US012401118B2

(12) United States Patent
Roberts et al.

(10) Patent No.: US 12,401,118 B2
(45) Date of Patent: Aug. 26, 2025

(54) ANTENNA PACKAGING METHODS

(71) Applicant: DISH Network L.L.C., Englewood, CO (US)

(72) Inventors: William Roberts, Centennial, CO (US); Matthew Bailey, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 56 days.

(21) Appl. No.: 18/359,803

(22) Filed: Jul. 26, 2023

(65) Prior Publication Data

US 2024/0021985 A1 Jan. 18, 2024

Related U.S. Application Data

(62) Division of application No. 17/357,688, filed on Jun. 24, 2021, now Pat. No. 11,757,181, which is a division of application No. 16/133,912, filed on Sep. 18, 2018, now Pat. No. 11,075,457.

(51) Int. Cl.

*H01Q 3/20* (2006.01)
*H01Q 1/00* (2006.01)
*H01Q 15/16* (2006.01)

(52) U.S. Cl.

CPC ............... *H01Q 3/20* (2013.01); *H01Q 1/005* (2013.01); *H01Q 15/16* (2013.01)

(58) Field of Classification Search

CPC .......... H01Q 3/20; H01Q 15/16; H01Q 1/005; H01Q 1/08; H01Q 19/13

See application file for complete search history.

(56) References Cited

U.S. PATENT DOCUMENTS 4,490,726 A 12/1984 Weir
4,932,910 A 6/1990 Hayday
5,485,169 A 1/1996 Kitabatake et al.
5,517,204 A 5/1996 Murakoshi et al.
5,554,998 A 9/1996 Sherwood et al.
5,646,638 A 7/1997 Winegard et al.

(Continued)

OTHER PUBLICATIONS

U.S. Appl. No. 17/393,627, Non-final Office Action, Oct. 13, 2023 (Available at USPTO Patent Center).

(Continued)

*Primary Examiner* — Awat M Salih

(74) *Attorney, Agent, or Firm* — Wash Park IP Ltd.; John T. Kennedy

(57) ABSTRACT

An antenna includes a folding mechanism for configuring the antenna into at least one of a first configuration and a second configuration. When in the first configuration, the antenna is configured for operational use. When in the second configuration, the antenna is configured for shipping in a package. A locking apparatus secures the antenna in either configuration. The folding mechanism and the locking mechanism configure the antenna into the first configuration. A method for preparing for shipment an antenna having a reflector with a width, a height, and depth, a backing structure coupled to the reflector, a first swivel plate, coupled to the backing structure, a feed arm bracket coupled to the first swivel plate, and a feed arm coupled to the feed arm bracket. The first swivel plate facilitates yaw rotations of the feed arm bracket, relative to the backing structure.

20 Claims, 6 Drawing Sheets

(56) References Cited

U.S. PATENT DOCUMENTS

| | | | | |
|---|---|---|---|---|
| 5,929,817 | A * | 7/1999 | Clark | H01Q 1/1235 343/714 |
| 6,366,253 | B1 | 4/2002 | Hemmingsen | |
| 6,424,314 | B1 * | 7/2002 | Baghdasarian | H01Q 15/161 343/882 |
| 7,015,872 | B1 | 3/2006 | Little | |
| 10,519,688 | B2 | 12/2019 | Gharabegian | |
| 10,554,436 | B2 | 2/2020 | Gharabegian | |
| 11,114,739 | B2 | 9/2021 | Bailey et al. | |
| 2004/0177871 | A1 | 9/2004 | Harbaugh | |
| 2008/0158078 | A1 | 7/2008 | Allen et al. | |
| 2009/0085825 | A1 | 4/2009 | Conrad | |
| 2009/0085826 | A1 | 4/2009 | Conrad | |
| 2009/0188537 | A1 | 7/2009 | Bacik | |
| 2009/0224549 | A1 | 9/2009 | Williams | |
| 2009/0224551 | A1 | 9/2009 | Williams | |
| 2009/0224553 | A1 | 9/2009 | Williams | |
| 2009/0243955 | A1 | 10/2009 | Legare et al. | |
| 2010/0149059 | A1 | 6/2010 | Patel | |
| 2011/0032172 | A1 | 2/2011 | Kirby et al. | |
| 2011/0283640 | A1 | 11/2011 | Miller | |
| 2015/0023017 | A1 | 1/2015 | Smith et al. | |
| 2015/0236397 | A1 | 8/2015 | Son et al. | |
| 2017/0040684 | A1 | 2/2017 | Turner | |
| 2018/0323489 | A1 | 11/2018 | Vermillion, Jr. | |
| 2019/0335865 | A1 | 11/2019 | Mullet et al. | |
| 2021/0320407 | A1 | 10/2021 | Roberts et al. | |
| 2021/0367318 | A1 | 11/2021 | Bailey et al. | |

OTHER PUBLICATIONS

U.S. Appl. No. 17/393,627, Response to non-final Office Action, Jan. 5, 2024 (Available at USPTO Patent Center).
U.S. Appl. No. 16/133,912, filed Sep. 18, 2018.
U.S. Appl. No. 16/133,912, Notice of Allowance, dated Apr. 5, 2021.
U.S. Appl. No. 16/133,912, Office Action Response, dated Mar. 29, 2021.
U.S. Appl. No. 16/133,912, Office Action, dated Dec. 30, 2020.
U.S. Appl. No. 17/357,688, filed Jun. 24, 2021.
U.S. Appl. No. 16/133,853, Issue Fee Payment, Aug. 4, 2021.
U.S. Appl. No. 16/133,853, Issue Notification, Aug. 19, 2021.
U.S. Appl. No. 17/357,688, Non-Final Office Action, mailed Dec. 14, 2022.
U.S. Appl. No. 17/357,688, Notice of Allowance, May 22, 2023.
U.S. Appl. No. 17/357,688, Response to Non-Final Office Action, Mar. 30, 2023.
U.S. Appl. No. 17/357,688, Restriction, Aug. 3, 2022.
U.S. Appl. No. 18/359,803, Application as filed, Jul. 26, 2023.
U.S. Appl. No. 17/393,627, filed Aug. 4, 2021.

* cited by examiner

ANTENNA PACKAGING METHODS

CROSS REFERENCE TO RELATED APPLICATIONS

This application is a Divisional patent application of and claims priority to U.S. patent application Ser. No. 17/357,688, which was filed on 24 Jun. 2021, and entitled "Antenna Packaging Systems" ((herein the "688 application"), which is a Divisional patent application of and claims priority to U.S. patent application Ser. No. 16/133,192, which was filed on 18 Sep. 2018, and entitled "Devices, Systems, Methods for Using and Methods for Packaging Antenna Systems," (herein the "'192 Application"), with both the '688 application and the '192 application being filed in the name of inventors Bailey et al., and the entire contents of both applications are incorporated herein by reference.

TECHNICAL FIELD

The subject matter described herein relates to devices and methods for allowing satellite antennas to be shipped in a single flat package. These devices and methods have particular but not exclusive utility for satellite TV and Internet service installation.

BACKGROUND

Satellite antennas are known, and are used to deliver satellite TV and Internet services. They may additionally be used for navigation, meteorology, fleet management, deep space communication, and military purposes. However, such antennas are bulky and are generally assembled on-site at the time of installation, from components that ship in separate packages. This assembly process is difficult for consumers, time consuming for professional installers, and the shipping process is expensive and wasteful of packaging materials.

More specifically, for many current antenna systems, an installation process involves unpacking separately packaged components and then assembling the components into a desired from. The components often include a reflector, a backing structure assembly, a feed arm, and a low-noise block downconverter (LNB), along with assorted attachment hardware such as nuts, bolts, and screws. Often, the reflector may have a parabolic shape.

Further, once the components are unpacked, the reflector, feed arm and LNB are assembled into a finished form that is then attached to a mast or similar mounting structure. Commonly, an installation technician attaches the reflector to the backing structure by threading bolts through a set of through holes and then securing them in place with nuts. It is to be appreciated that an installer may include a licensed installation technician, an electrician, a home-owner, or otherwise (herein, an "installer"). In a typical example, four bolts are secured through four through-holes. Next, the LNB bracket is attached to the end of the feed arm using additional nuts, bolts, and screws. In a typical example, two bolts are secured through two through-holes, and two screws are secured into two threaded holes. The backing structure is then mounted to the mast, or to a roof, wall, railing, or other convenient attachment point. Finally, the installed antenna assembly is "peaked", or precisely oriented toward a particular geostationary satellite or plurality of geostationary satellites, in order to maximize signal strength. Most of the time used to attach the antenna/backing structure assembly to the mast is spent installing the attachment hardware to hold everything together. The antenna systems are not preassembled due to their awkward size and the cost it would take to ship them. It is to be appreciated that such commonly used components, installation processes, and packaging approaches have numerous drawbacks, including risks of misalignment, time costs, packaging costs, and otherwise. Accordingly, needs exist for devices, processes, packaging approaches, and otherwise which address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed are various embodiments of a lay flat antenna assembly, and a method for installing it. The lay flat antenna assembly may include one or more pivots or swivel plates between components of the antenna assembly, such that they are may rotate with respect to one another. The assembly may include a locking apparatus for each pivot or swivel plate that is capable of arresting the pivot's rotation and fixing it at a given angle. As such and for at least one embodiment of the present disclosure, an antenna may be folded and locked into a flat, compressed configuration for storage and shipping, and may be readily unfolded and locked into a three-dimensional, expanded configuration for installation and operation. Accordingly, at least one embodiment of the present disclosure reduces installation labor, improves quality control, and permits shipping of an antenna assembly in a single package.

The various embodiments of a lay flat antenna assembly disclosed herein have particular, but not exclusive, utility for the installation of satellite TV and Internet service equipment. The lay flat antenna assembly permits the satellite antenna to be folded into a flat configuration for storage or shipping in a single package, and to be unfolded and locked into place in an installation or operational configuration.

In accordance with at least one embodiment of the present disclosure, a device for use in configuring an antenna system into each of a first configuration and a second configuration may include a backing structure, a feed arm, and a first swivel plate. The first swivel plate may be attached to each of and positioned between the backing structure and the feed arm. The first swivel plate may be configured to facilitate horizontal rotation of the feed arm into at least one of a first configuration and a second configuration. For at least one embodiment, the horizontal rotation may arise in a plane perpendicular to a plane along which the backing structure extends upwards for a given height.

For at least one embodiment, a device for use in configuring an antenna system into each of a first configuration and a second configuration may include a locking apparatus configured for securing the first swivel plate at each of a first angle when the antenna system is configured into the first configuration, and a second angle when the antenna system is configured into the second configuration. For at least one embodiment, the antenna system may be configured for operational use when in the first configuration. For at least one embodiment, the antenna system may be configured, when in the second configuration, for at least one of storage and shipping in a single package.

For at least one embodiment, a device for use in configuring an antenna system into each of a first configuration and a second configuration may include a second swivel plate configured to facilitate vertical rotation of the feed arm upward into a folded state and downward into an unfolded state. For at least one embodiment, a device for use in configuring an antenna system into each of a first configuration and a second configuration may include a second locking mechanism configured to facilitate locking of the second swivel plate in either the folded state or the unfolded state. For at least one embodiment, when the first swivel plate is locked in the first configuration and the second swivel plate is locked in the unfolded state, the antenna system is configured for operational use.

For at least one embodiment, a device for use in configuring an antenna system into each of a first configuration and a second configuration may include use of a first swivel plate which, when the antenna system locked in the second configuration and the second swivel plate is locked in the folded state, the antenna system is configured for at least one of shipping, storage, and packaging in a single package having dimensions dominated by the height and length of a reflector utilized in the antenna system.

For at least one embodiment, a device for use in configuring an antenna system into each of a first configuration and a second configuration may include a reflector and a low-noise bandwidth converter. For at least one embodiment, the reflector may be attached to the backing structure. The low-noise bandwidth converter may be attached to the feed arm. When in the first configuration, the device may be configured to at least one of send and receive radio frequency signals. When in the first configuration, the device may be configured to withstand static and dynamic loads. For at least one embodiment, the static and dynamic loads include wind loads up to 155 miles per hour. For at least one embodiment, instructions may be provided for at least one of unfolding, unpacking, assembly, and installation of the device.

For at least one embodiment, a device for use in configuring an antenna system into each of a first configuration and a second configuration may include use of a reflector having a reflector height, a reflector length, and a reflector width. Dimensions of the device in each of the first configuration and the second configuration are dominated by at least one of the reflector height and the reflector length. A width of the device in the first configuration is dominated by the reflector width.

For at least one embodiment, a method for installing an antenna may include operations of rotating a feed arm from a second configuration into a first configuration using a first swivel plate coupling a backing structure to the feed arm. The operations may also include locking the feed arm into the first configuration. The antenna, when in the second configuration, may be configured for at least one of storage, shipping and packaging. The antenna, when locked in the first configuration, may be configured for operational use. For at least one embodiment, the antenna, when in locked in the first configuration, may be configured to withstand static loads and dynamic loads. For at least one embodiment, the operations may include rotating the feed arm at least one of in a downward direction from a folded state and into an unfolded state and in an upward direction from the unfolded state to the folded state. A second swivel plate may be used to second couple the feed arm to the backing structure and may be configured to facilitate vertical rotation of the feed arm. the operation may include locking the swivel plate in one of the unfolded state and the folded state. When the antenna is configured in each of the first configuration and the unfolded state, the antenna may be configured for operational use. When the antenna is configured in the second configuration, the antenna may be configured for at least one of shipping, storage and packaging. The antenna is capable of withstanding static loads and dynamic loads up to 155 miles per hour. Instructions for folding, packing, assembly, or installation may be provided on the antenna.

For at least one embodiment, a method for installing an antenna may include use of an antenna that includes a reflector having a reflector height, a reflector length, and a reflector width. The dimensions of the antenna in each of the first configuration and the second configuration may be dominated by at least one of the reflector height and the reflector length. A width of the antenna in the first configuration may be dominated by the reflector width.

For at least one embodiment of the present disclosure, a system for shipping and installing an antenna may include a package, an antenna and a folding mechanism for configuring the antenna into at least one of a first configuration and a second configuration. For at least one embodiment, when in the first configuration, the antenna may be configured for operational use. For at least one embodiment, when in the second configuration, the antenna may be configured for at least one of shipping, storage and packaging. A locking apparatus configured for use in securing the antenna in either the first configuration or the second configuration may be included. By use of the folding mechanism and the locking mechanism, an installer may configure an antenna received in the second configuration into the first configuration. Upon configuring the antenna into the first configuration, the antenna may be ready for installation onto a mounting structure.

For at least one embodiment of the present disclosure, a system for shipping and installing an antenna may include a second folding mechanism. The second folding mechanism may be configured to facilitate vertical rotation of at least one antenna element. The system may include a second locking apparatus configured to facilitate locking of the at least one antenna element in at least one of a folded state and an unfolded state. When configured in the folded state, the antenna occupies a smaller volume than when in the unfolded state. When locked in the unfolded state, the antenna is capable of withstanding at least one of static loads and dynamic loads, including wind loads up to 155 miles per hour. At least one of folding, packing, assembly, and installation instructions may be provided on or with the antenna. The antenna has overall antenna dimensions and the reflector has reflector dimensions including a reflector height, a reflector length, and a reflector width. The overall antenna dimensions in each of the first configuration and the second configuration are dominated by at least one of the reflector height and the reflector length. When the antenna is configured in the first configuration, a depth dimension of the overall antenna dimensions may be dominated by the reflector width. The antenna may include a backing structure having a backing structure width. When the antenna is configured in the second configuration, the depth dimension of the overall antenna dimensions may be dominated by the backing structure width.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the lay flat antenna assembly, as defined in the claims, is provided in the following written description of various embodiments of the disclosure and illustrated in the accompanying drawings.

DETAILED DESCRIPTION

Figure 1:
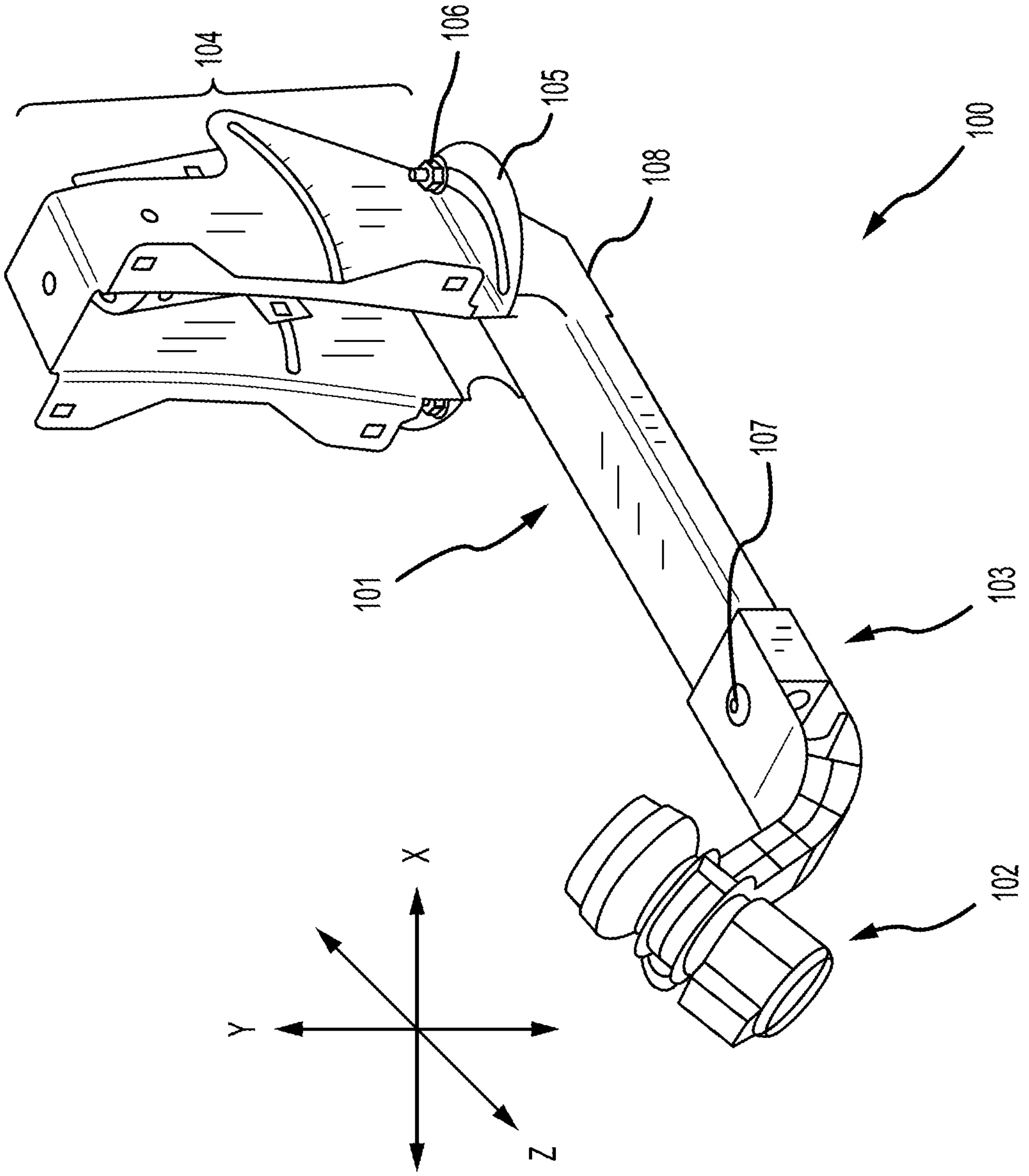
FIG. 1 is a front isometric view of a backing structure assembly for a lay-flat antenna and in accordance with at least one embodiment of the present disclosure.

In accordance with at least one embodiment of the present disclosure, a collapsible or foldable antenna backing structure is provided which allows components of an antenna system to be pre-assembled at a factory, shop facility, or otherwise. Such components for an antenna system may include one or more of a reflector, a backing structure, a feed arm, an LNB or other radio frequency (RF) energy receiving device, hardware and other components. For at least one embodiment, the combined assembly for an antenna system may be shipped as one piece to an installer. For at least one embodiment, the combined assembly for an antenna system may be provided in a collapsed state which may fit into a single package, such as a substantially shallow or flat package.

For at least one embodiment, when an antenna system according to the present disclosure is desired for installation, the installer may remove the combined assembly from packaging, swivel the feed arm into place, engage a spring loaded locking pin, and proceed with attaching the antenna system to a mast or other mounting surface, device or structure. It is to be appreciated that the foregoing operations involve substantially fewer installation steps and commonly will save several minutes when compared to existing antenna installation procedures. Further, it is to be appreciated that shipping costs may also be substantially reduced, as the number of packages and total volume of packages will result in a smaller shipping volume, where the shipping volume is a combination of the total height, width, and depth of the packages used to otherwise provide the above-mentioned components. It is to be appreciated, a device may include a package containing a combined assembly of an antenna system in accordance with at least one embodiment of the present disclosure. Such a package may or may not include one or more LNB or other receiving components attached to a feed arm.

In accordance with at least one embodiment of the present disclosure, the backing structure may include as integrated therewith and/or be configured for use therewith a swivel plate. The swivel plate may be used between the feed arm and the backing structure and allows rotation of the former relative to the latter under controlled conditions. For at least one embodiment, a swivel plate may be riveted or may employ conventional hardware, such as nuts and bolts, to secure the feed arm to the backing structure while also permitting rotation about one or more axis. Having the connection between the feed arm and backing structure rotatable allows the antenna system or portions thereof to be pre-assembled at the factory, prior to shipment to the field. With this configuration, an installer may proceed by removing the antenna assembly from its protective packaging, rotating the feed arm into a desired position, secure the feed arm at its desired position, and place the assembly on a mast or other attachment point. It is to be appreciated, however, that one or more of these operations may occur in a different order or sequence of operations.

For at least one embodiment, the feed arm may be secured and/or "locked" into a desired operational position, for use, by use of a locking pin, tightening hardware, spring mechanism, or otherwise. Such locking mechanism(s) may be provided free-standing or integrated, in whole or in part, with one or more of the backing structure, feed arm, swivel plate, or otherwise.

Likewise, for at least one embodiment, the feed arm may be aligned, and/or locked, in a desired operational or non-operational position, at any time. It is to be appreciated that such an operational or non-operational position alignment and/or locking may be desirable during attachment of the antenna system to a mast, during shipment, repositioning, or otherwise. For at least one embodiment, locking of the feed arm into an operational position may occur after attachment of the antenna system to a mast or other mounting structure. Further, it is to be appreciated that by providing a rotatable feed arm, relative to the backing structure, time savings may be realized during assembly of the antenna system. Such time savings may often eliminate and/or reduce one or more time consuming steps of commonly pursued antenna installation processes today. Further, it is to be appreciated that for at least one embodiment of the present disclosure, the use of loose and/or separately packaged hardware commonly utilized to attach the reflector, feed arm, and otherwise to the backing structure can be reduced, and for at least one embodiment, eliminated.

Furthermore, current practices of attaching a reflector to a backing structure on-site often present a number of risks. Over-torqueing of bolts may distort the reflector, whereas under-torqueing may allow the reflector to become misaligned, to wobble under dynamic loads, to loosen itself, or to be more susceptible to damage. Furthermore, off-axis alignment of the feed arm at the time of in-field installation may result in radio-frequency (RF) energy not being directed properly reflected towards the LNB attached to a distant end of feed arm. It is to be appreciated, that when the feed arm and LNB extending therefrom are properly aligned relative to the reflector surface, a maximal amount of desired RF energy, transmitted by a satellite or other transmitting source and impinging on the reflector, is directed to the LNB and/or other receiving component(s).

It is to be appreciated, that the direction of the maximal of RF energy may include one or more beams of RF energy emitted from one or more sources and such multiple beams may be directed by the reflector to one or more separate, or the same focal points. The LNB and/or one or more receiving components, may be positioned at such one or more focal points. Given these and other considerations, it is to be appreciated that one or more embodiments of the present disclosure facilitate highly-accurate positioning of LNBs and/or other RF energy receiving components at desired focal point locations. As used herein, "highly-accurate positioning" of an LNB relative to a focal point of reflected RF energy from a reflector means that the actual positioning of the LNB relative to the desired positioning of the LNB is within +/−1.6 degrees of specifications.

Further, it is to be appreciated that, for at least one embodiment, attachment of one or more of a reflector, feed arm, LNB and/or other components to a backing structure may occur in a quality-controlled factory or other setting as part of the manufacturing and/or assembly process, as opposed to being completed in the field by an installer. Resulting quality, alignment accuracy, and consistency may result in less installation rework, less ongoing maintenance, longer antenna system operational life, and other savings in time, material, labor, packaging, shipment, and otherwise.

These descriptions are provided for exemplary purposes only, and should not be considered to limit the scope of any embodiment of the described lay flat antenna, assembly of such lay flat antenna, packaging of an antenna system, or otherwise. Certain features may be added, removed, or modified without departing from the spirit of the claimed subject matter.

FIG. 1 is a front isometric view of an antenna system 100 in accordance with at least one embodiment of the present disclosure. As shown, the antenna system 100 may include a feed arm 101 attached to a feed arm bracket 108, a low-noise block downconverter (LNB) 102 mounted to an LNB bracket 103, a backing structure 104, and a swivel plate mechanism 105 positioned between the feed arm 101 and the backing structure 104. For at least one embodiment, the swivel plate 105 facilitates rotational movement of the feed arm 101 relative to the backing structure in at least one axis. For at least one embodiment, such rotation occurs horizontally about a Y axis formed by the feed arm rotating substantially perpendicularly to the backing structure 104. It is to be appreciated that one or more other axes of rotation may be utilized for other embodiments. Antenna system 100 may also include a reflector, which is not shown in FIG. 1 for purposes of illustration of other antenna system 100 components.

As shown in FIG. 1, the swivel plate 105 is in a deployed, operational state. The swivel plate 105 may be secured in this position using a locking apparatus 106. For at least one embodiment, the locking apparatus 106 may include one or more of a ratchet, a detent, a through-hole, cotter pin, a threaded hole with bolt and wingnut, a threaded hole with bolt and lock nut, or any other apparatus or device for locking the swivel plate 105 in any desired orientation, such as an operational orientation, a shipping orientation, a stowage orientation, or otherwise.

The LNB bracket 103 may be secured to the feed arm 101 with attachment hardware 107. Such attachment hardware 107 may include, but is not limited to, a threaded hole and a screw, a through hole, bolt, and nut, and other types of attachment hardware may be used, including but not limited to, pins, clips, rivets, welds, and other known attachment techniques and devices.

The feed arm 101 may be attached to the feed arm bracket 108. Any desired type of attachment hardware 107 may be utilized, such as those described above. For at least one embodiment, the feed arm 101 may be welded to the feed arm bracket 108. Attachment hardware, devices and/or techniques may be the same or may vary for the attachment of any antenna system component to another antenna system component.

The backing structure 100 may be designed to withstand static and dynamic loads for a given intended use environment. Such use environments may vary by topography, location, latitude, longitude or otherwise. Non-limiting examples of use environments include, but are not limited to, wind, hurricane, tornado, snow, ice, and other environments. For at least one embodiment, backing structure 100 is configured to withstand one or more given use environments, without breaking apart, becoming misaligned, or otherwise experiencing a failure in terms of performance, configuration, assembly or otherwise. For example, in order to comply with hurricane regulations in the United States state of Florida, the backing structure 100 may be designed to withstand winds of up to 155 miles per hour without breaking apart and releasing components or fragments as projectiles.

In accordance with at least one embodiment of the present disclosure, the addition of the swivel plate 105 between the feed arm 101 and the backing structure 104 facilitates rotation of the feed arm 101 relative to the backing structure 104. This configuration further facilitates configuring of the antenna system 100 for storage and shipping, and also facilitates the unfolding of the antenna system for installation. Further, the use of the swivel plate 105 for at least one embodiment, facilitates use of one or more assembly processes that may occur in a factory, shop, or other setting, while also removing the presently common process steps of on-site assembly of the antenna system by an installer.

Figure 2:
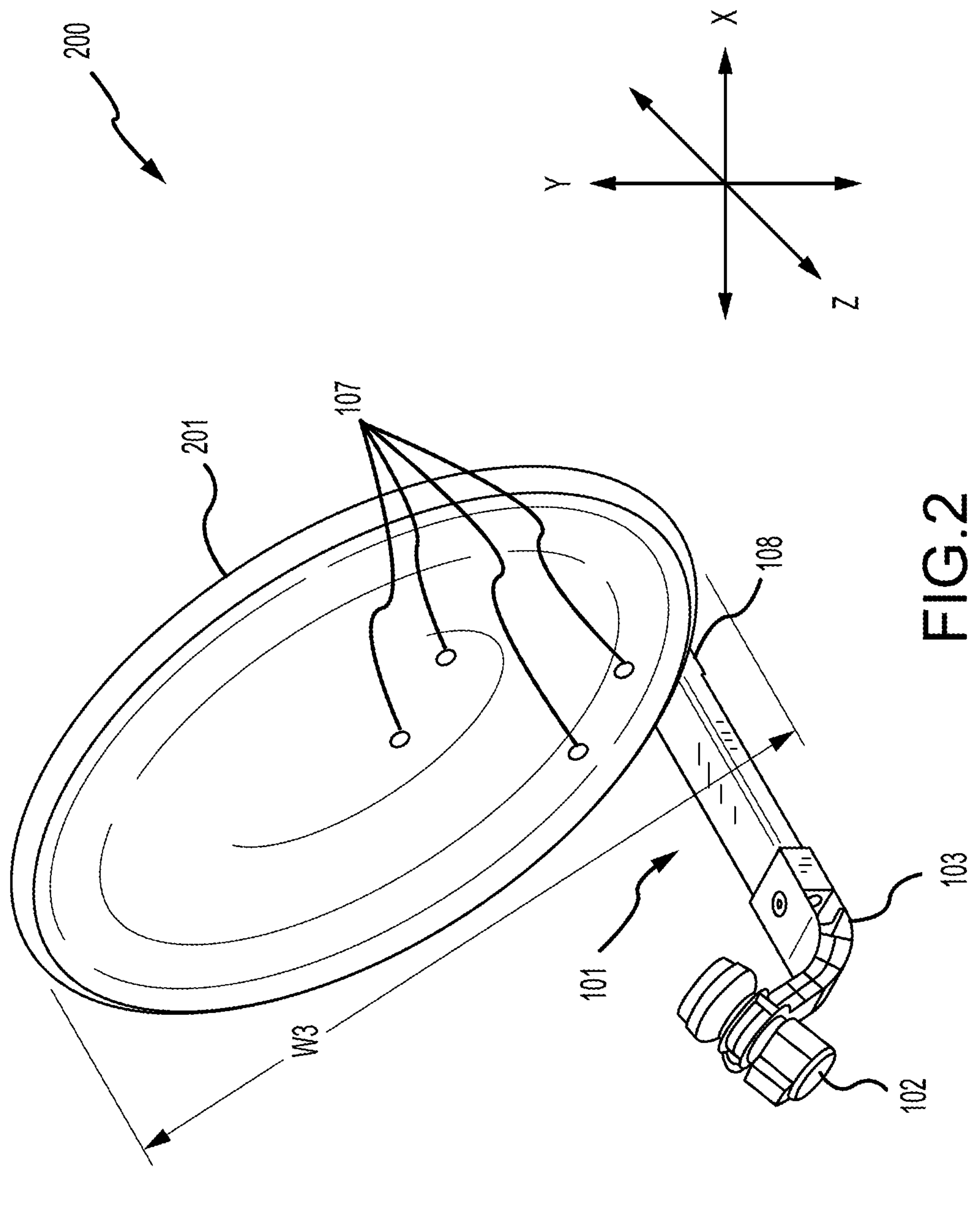
FIG. 2 is a front isometric view of a lay flat antenna assembly and in accordance with at least one embodiment of the present disclosure.

FIG. 2 is a front isometric view of an example antenna system 200, wherein a reflector 201, the feed arm bracket 108, the feed arm 101, the LNB bracket 103, and the LNB 102 are shown. The reflector 201 is secured to the backing assembly 104 (not visible in FIG. 2) with attachment hardware 107. The LNB bracket 103 is attached to the feed arm 101 with attachment hardware 107. The antenna system 200 is depicted in an unfolded, operational, installable or first configuration.

Figure 3:
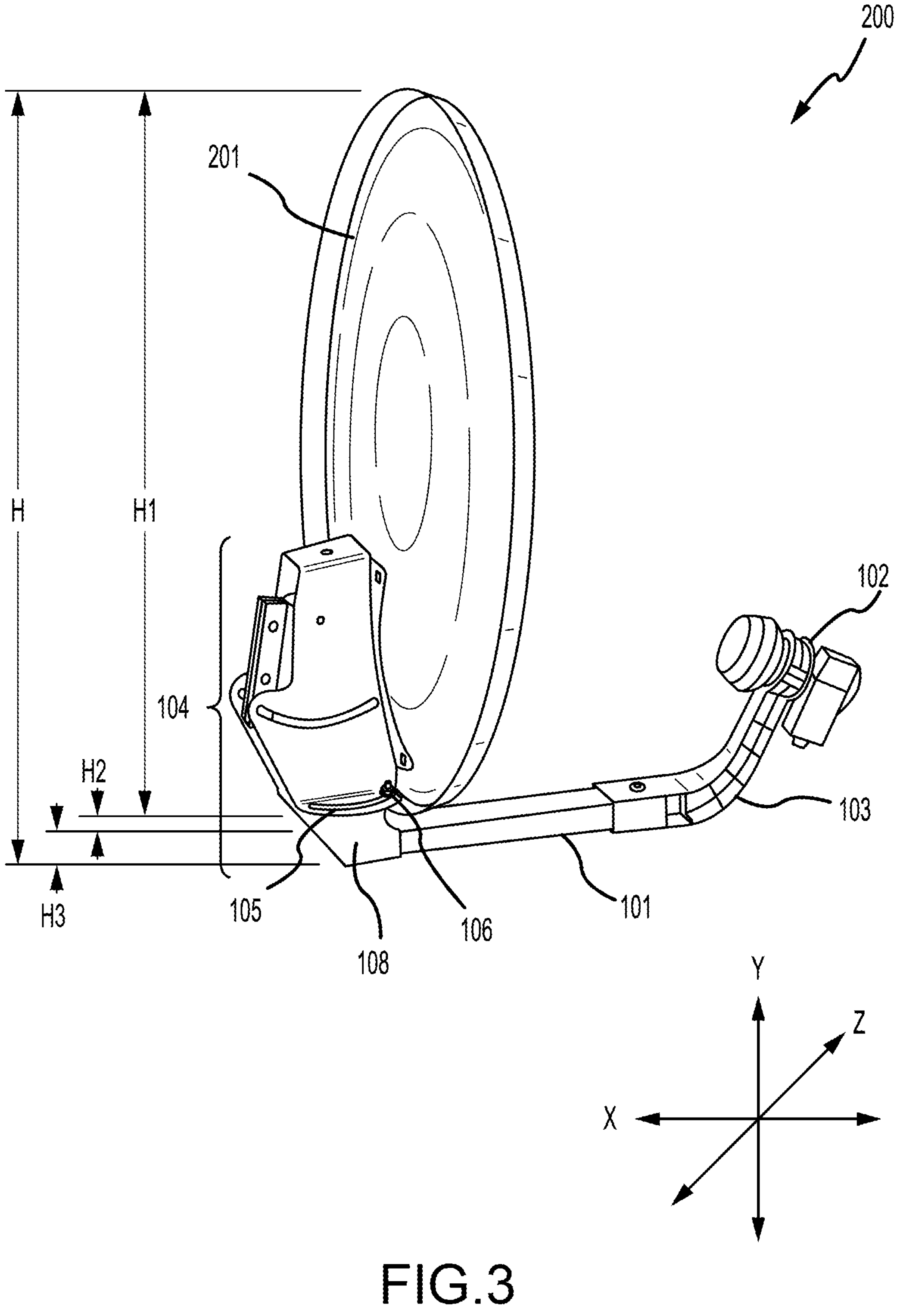
FIG. 3 is a side isometric view of a lay flat antenna assembly and in accordance with at least one embodiment of the present disclosure.

FIG. 3 is a side isometric view of the antenna system 200 of FIG. 2. The antenna system 200 is depicted in an unfolded, operational, or installable configuration (a "first configuration").

Figure 4:
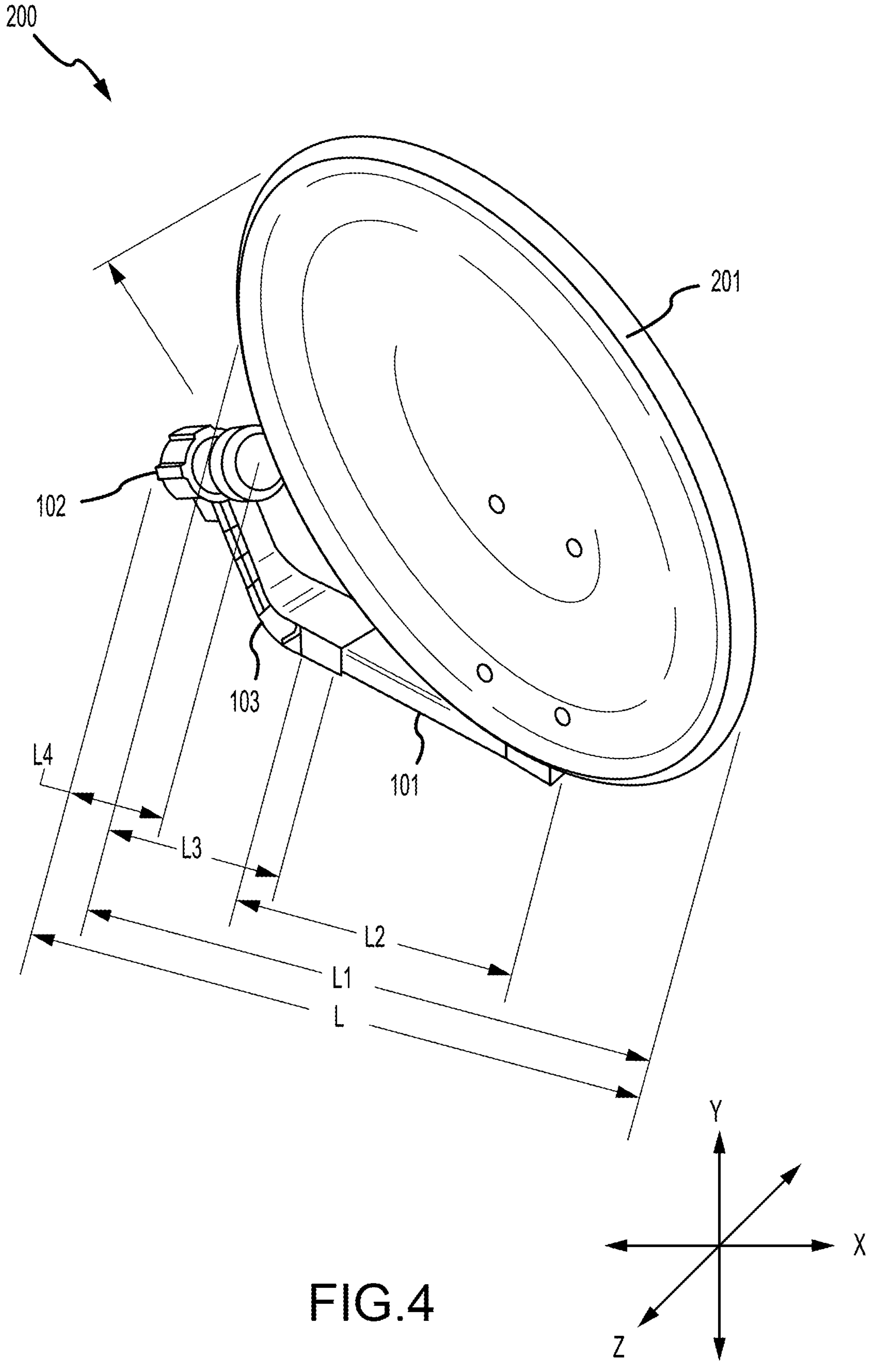
FIG. 4 is a front isometric view of a lay flat antenna assembly in its folded storage or shipping configuration and in accordance with at least one embodiment of the present disclosure.

FIG. 4 is a front isometric view of the antenna system 200 in a folded, storage, or shipping configuration (a "second configuration").

Figure 5:
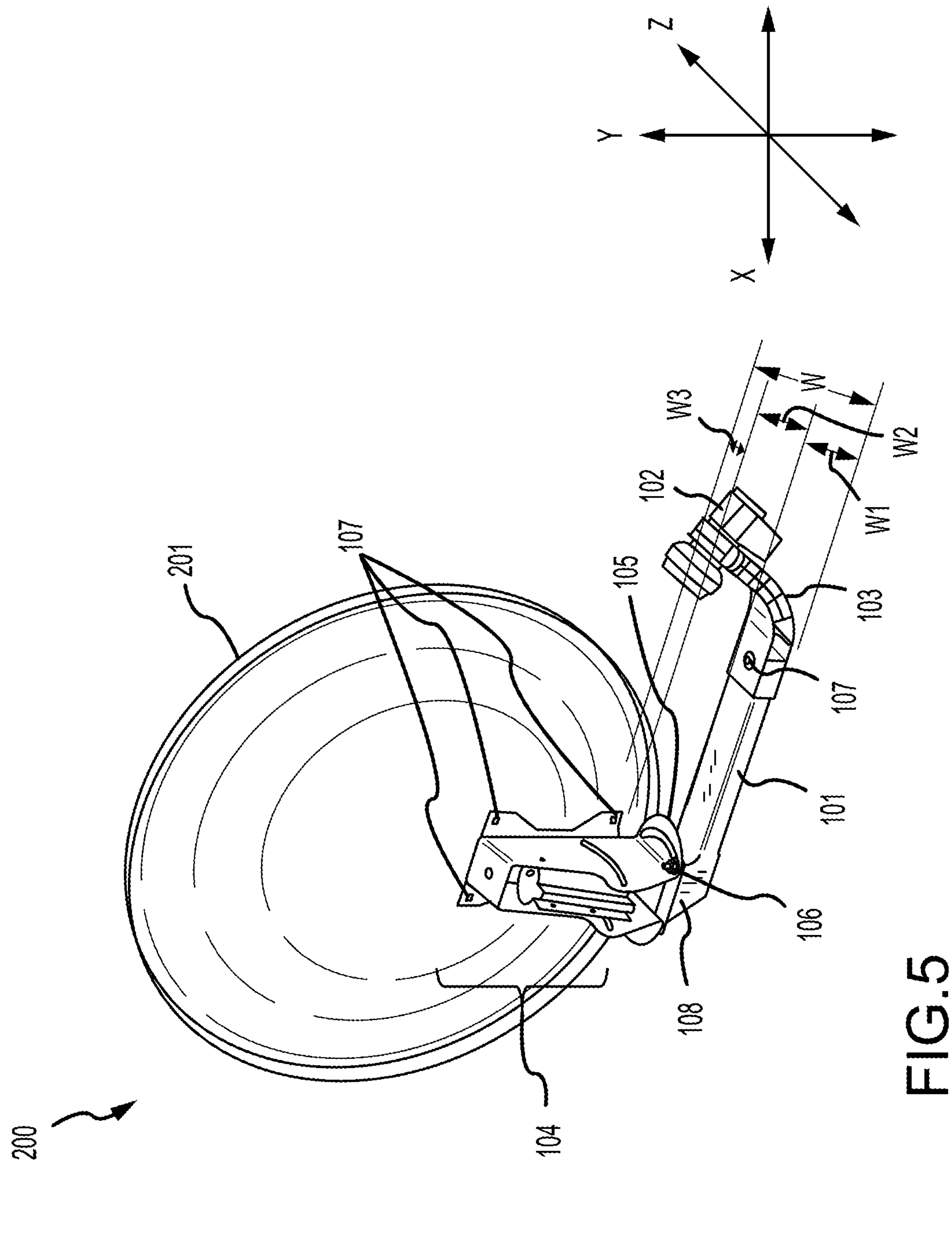
FIG. 5 is a rear isometric view of a lay flat antenna assembly in its folded storage or shipping configuration and in accordance with at least one embodiment of the present disclosure.

FIG. 5 is a rear isometric view of the antenna system 200 in the second configuration.

As shown by FIG. 4, when in the second configuration, the antenna system 200 has dimensions wherein the total length L of the antenna system is determined by portions of each of the combined first length L1 of the reflector 201, a second length L2 of the feed arm 101, a third length L3 of the LNB bracket 103, and a fourth length L4 of the LNB 102, as assembled, which extend beyond any other component of the antenna system. It is to be appreciated, that as the portions of each of the lengths increase, the total length of the antenna system 200 may or may not increase, as for at least one embodiment, the denominate length of the antenna system is the first length L1 of the reflector 201.

As shown in FIG. 3 for the first configuration and in FIG. 4 for the second configuration, the total height "H" of the antenna system 200 is determined by a combination of a first height H1 of the reflector 201, a second height H2 of the extension of the feed arm 101 between a bottom edge of the reflector 201 and a top surface of the feed arm 101, and a third height H3 of the feed arm, as assembled. It is to be appreciated that for at least one embodiment, the height of the antenna system 200 is the same for both the first configuration and the second configuration. As shown for at least one embodiment, the total height H of the antenna system in both the first configuration and the second configuration are dominated by the height of the reflector 201.

As shown in FIG. 5, the total width "W" of the antenna system 200 is determined by the combination of a first width W1 of the feed arm 101, a second width W2 by which the backing structure 104 extends from the feed arm 101 and a third width W3 of the reflector 201. As shown for at least one embodiment, the depth W3 of the reflector 201 is less than each of the second width W2 of the extension of the backing structure 104 and the first width W1 of the feed arm 101. As shown in FIG. 2, the total width W of the antenna system 200, when in the first configuration, is determined by the third width W3 of the reflector. As shown for at least one embodiment, the total width W of the antenna system 200, when in the second configuration, is dominated by the width W2 of the backing structure. Accordingly, it is to be appreciated that the dimensions of the antenna system 200, in both the first configuration and the second configuration are respectively governed by the first height H1 and first length L1 of the reflector 201 and, when in only the first configuration, by the width W3 of the reflector 201. Accordingly, by use of the swivel plate 105 it is to be appreciated that packaging sizing can be reduced such that the width of any given package for the antenna system, as in the second configuration, is substantially determined by the second width W2.

Further, it is to be appreciated from the various views that when in the second configuration of entire antenna system 200 may fit into a single flat package of having dimensions L×H×W, with W now being dependent on the second width W2, which reduce packaging sizing and shipping costs. Furthermore, the antenna system 200 may be unfolded and locked into the first configuration by an installer by performing only the rotation of the feed art about the Y axis, which presumably and an untrained person could accomplish. Such ease of installation further facilitating cost savings from use of an embodiment of the present disclosure and further facilitating accurate and consistent installation of an antenna system 200 by such a non-skilled installer.

Based on design considerations, the components described above may be of substantially different shape than depicted in the Figures, while still operating in the same or an equivalent manner. The locking apparatus and any of the attachment hardware may include wing nuts, lock nuts, flat washers, spring-lock washers, serrated flanges, detents, or other equivalent attachment aids.

As will be readily appreciated by those having ordinary skill in the art after becoming familiar with the teachings herein, this disclosure solves a long-standing need in the satellite communications industry and other industries using directional antenna assemblies, by providing an antenna structure that is easily manufactured to consistent standards, as well as easily assembled and installed.

Figure 6:
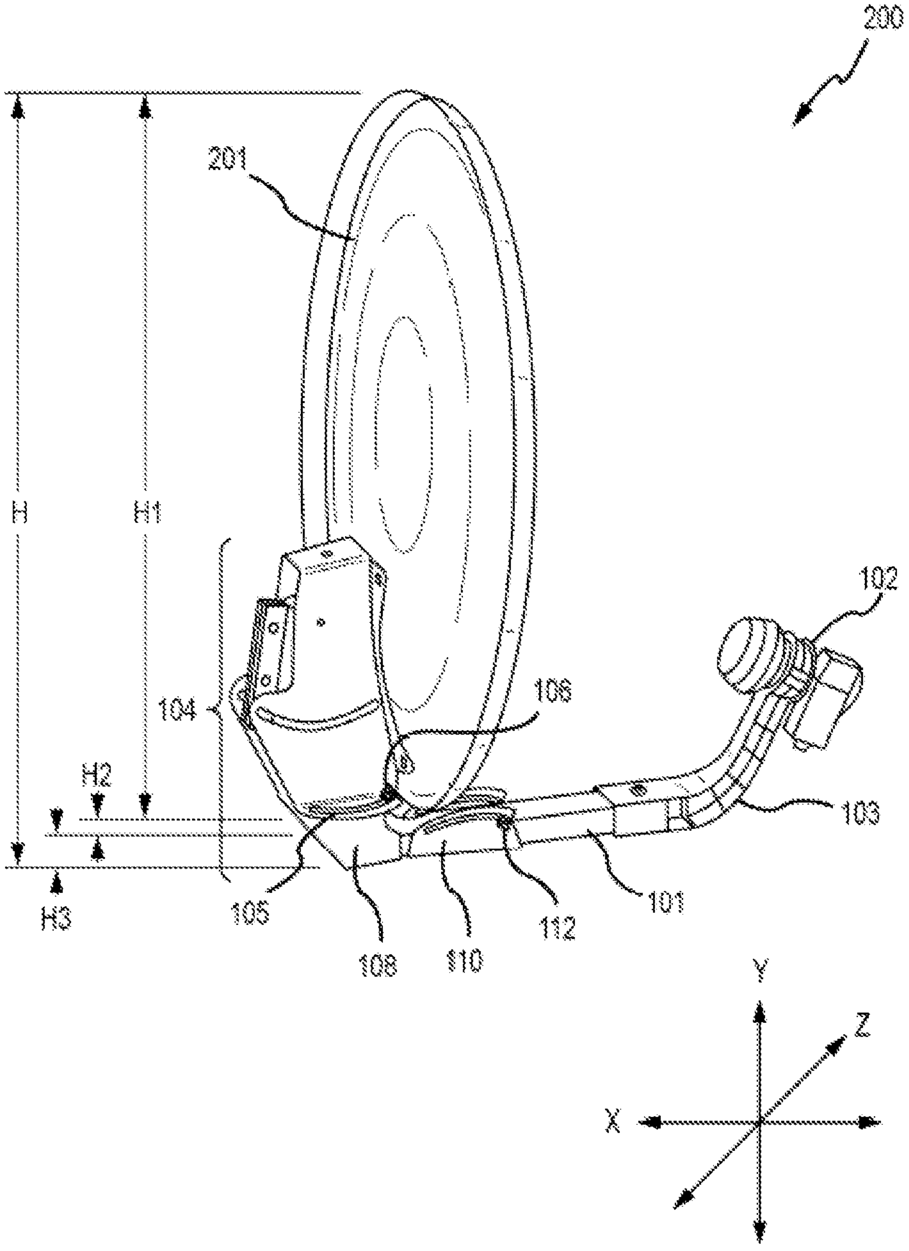
FIG. 6 is a side isometric view of a lay flat antenna assembly and in accordance with at least one second embodiment of the present disclosure.

A number of variations are possible on the examples and embodiments described above. For example and as shown in FIG. 6, the lay flat antenna assembly may also include a second pivot or swivel mechanism, such as a second swivel plate 110 and a second locking mechanism 112, configured to permit the feed arm or LNB to be rotated vertically upward and locked in a folded state, and rotated vertically downward and locked in an unfolded state for use, thus permitting the shipment of the folded lay flat antenna assembly in an even smaller package. The components described herein may be manufactured by stamping, folding, forging, molding, 3D printing, or other standard manufacturing techniques that are known in the art. The logical operations making up the embodiments of the technology described herein are referred to variously as operations, steps, objects, elements, components, or modules. It should be understood that the manufacturing, assembly, and installation steps described above may be performed in any order, unless explicitly claimed otherwise or a specific order is inherently necessitated by the claim language.

In some implementations, some or all fasteners may be eliminated by combining certain components as single units. It should further be understood that the described technology may be employed in other industries than satellite communications, and may be applied to non-satellite antennas including TV antennas, microwave and RF communication antennas, and acoustic listening devices.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the lay flat antenna assembly. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the lay flat antenna assembly as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, components may be made of many varied materials, and may be colored or patterned for aesthetic purposes or for ease of assembly. Additionally, instructions or indicators may be provided on the antenna system 200 itself, in the form of permanent or removable stickers or other markings, that teach or demonstrate the packing, assembly, or installation of the lay flat antenna assembly.

Alternatively, instructions may be provided separately, or even left out entirely, given the simplicity of deployment. The mechanism may even be designed to unfold and lock into place automatically, for example, when shaken firmly or when a spring-loaded catch is released.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A method, for preparing an antenna for shipment, comprising:

receiving an antenna comprising:

a reflector having an antenna width, an antenna height, and an antenna depth;

wherein the antenna width corresponds to an x-axis of a coordinate system;

wherein the antenna height corresponds to a y-axis of the coordinate system; and wherein the antenna depth corresponds to a z-axis of the coordinate system;

a backing structure coupled to the reflector;

a first swivel plate, coupled to the backing structure, having a first axis;

a feed arm bracket coupled to the first swivel plate; and a feed arm coupled to the feed arm bracket;

wherein the first swivel plate facilitates a yaw rotation of the feed arm bracket, relative to the backing structure, about the first axis; and first rotating the feed arm bracket about the first axis of the first swivel plate.

2. The method of claim 1, whereupon completion of the first rotating, the antenna is in a first folded configuration and the feed arm bracket is aligned such that the feed arm extends in a direction parallel to the x-axis.

3. The method of claim 2, further comprising:

while the antenna is in the first folded configuration, inserting the antenna into a package.

4. The method of claim 3, wherein the package has a package width determined based on the antenna width.

5. The method of claim 2, wherein the antenna further comprises:

a second swivel plate coupling the feed arm bracket to the feed arm and having a second axis; and wherein the second swivel plate facilitates a pitch rotation of the feed arm, relative to the feed arm bracket, about the second axis; and the method further comprising:

second rotating the feed arm about the second axis of the second swivel plate.

6. The method of claim 5, whereupon and after completion of the first rotating followed by the second rotating, the antenna is in a second as-folded configuration where the feed arm extends in a direction parallel to the y axis.

7. The method of claim 6, further comprising:

while the antenna is in the second folded configuration, inserting the antenna into a package.

8. The method of claim 7, wherein the package has a package length determined based on the antenna height.

9. The method of claim 5, wherein the antenna further comprises:

a first locking apparatus configured for securing the first swivel plate at a first angle for shipping of the antenna; and the method further comprising:

after the first rotating, tightening the first locking apparatus to inhibit rotation of the first swivel plate.

10. The method of claim 9, wherein the antenna further comprises:

a second locking apparatus configured for securing the second swivel plate at a second angle for shipping of the antenna; and the method further comprising:

after the second rotating, tightening the second locking apparatus to inhibit rotation of the second swivel plate.

11. The method of claim 10, further comprising:

inserting the antenna into a package;

wherein a package width is determined based on the antenna width;

wherein a package length is determined based on the antenna height; and wherein a package depth is determined based on a combination of the antenna depth and a backing structure depth.

12. A method, for configuring an antenna for shipping, comprising:

first rotating a feed arm bracket of an antenna about a first axis of a first swivel plate for an antenna;

wherein the first swivel plate is coupled to a backing structure;

wherein the backing structure is coupled to a reflector for the antenna;

wherein the feed arm bracket is coupled to the first swivel plate; and wherein a feed arm is coupled to the feed arm bracket.

13. The method of claim 12, wherein the first swivel plate facilitates a yaw rotation of the feed arm bracket, relative to the backing structure, about the first axis.

14. The method of claim 12, wherein upon completion of the first rotating, the antenna is in a first folded configuration and the feed arm bracket extends in a direction parallel to a width of the reflector.

15. The method of claim 12, further comprising:

after the first rotating, locking the first swivel plate at a first angle.

16. The method of claim 15, further comprising:

second rotating the feed arm about a second swivel plate axis; and wherein the second swivel plate couples the feed arm bracket to the feed arm.

17. The method of claim 12, further comprising:

second rotating the feed arm about a second swivel plate axis; and wherein the second swivel plate couples the feed arm bracket to the feed arm.

18. The method of claim 17, wherein upon completion of the first rotating followed by the second rotating the feed arm extends in a direction parallel to a height of the reflector.

19. The method of claim 18, further comprising:

after the second rotating, securing the second swivel plate at a second angle.

20. A method, for configuring an antenna for shipping, comprising:

first, rotating a feed arm bracket of an antenna about a first axis of a first swivel plate for an antenna;

wherein the first swivel plate is coupled to a backing structure;

wherein the backing structure is coupled to a reflector for the antenna;

wherein the feed arm bracket is coupled to the first swivel plate;

wherein a feed arm is coupled to the feed arm bracket;

wherein the first swivel plate facilitates a yaw rotation of the feed arm bracket, relative to the backing structure, about the first axis; and wherein upon completion of the first rotating, the antenna is in a first folded configuration and the feed arm bracket extends in a direction parallel to a width of the reflector;

second, locking the first swivel plate at a first angle;

third, rotating the feed arm about a second swivel plate axis; and wherein the second swivel plate couples the feed arm bracket to the feed arm;

fourth, securing the second swivel plate at a second angle; and wherein upon completion of the first rotating followed by the third rotating the feed arm extends in a direction parallel to a height of the reflector.

* * * * *